United States Patent [19]

Saghri

[11] Patent Number: 5,738,555
[45] Date of Patent: Apr. 14, 1998

[54] ATTACHMENT ASSEMBLY FOR SECURING A HYDRODYNAMIC PROPULSION SURFACE TO A BODY BOARD

[75] Inventor: Abdolhamid Saghri, 8207 Stone Trail Dr., Bethesda, Md. 20817

[73] Assignee: Abdolhamid Saghri, Bethesda, Md.

[21] Appl. No.: 756,919

[22] Filed: Dec. 2, 1996

[51] Int. Cl.⁶ ............................................. A63C 15/00
[52] U.S. Cl. ............................................. 441/65; 440/9
[58] Field of Search .................... 441/65, 66, 67, 441/69, 74, 79; 440/9, 22

[56] References Cited

U.S. PATENT DOCUMENTS

| | | |
|---|---|---|
| D. 183,010 | 6/1958 | Martin . |
| D. 192,713 | 5/1962 | Lowrey . |
| D. 199,470 | 10/1964 | Ziff . |
| D. 207,681 | 5/1967 | Heston . |
| D. 216,445 | 1/1970 | Vasilatos . |
| D. 216,446 | 1/1970 | Vasilatos . |
| D. 216,447 | 1/1970 | Vasilatos . |
| D. 216,488 | 1/1970 | Vasilatos . |
| D. 216,530 | 2/1970 | Ziff . |
| D. 245,973 | 10/1977 | Vasilatos et al. . |
| D. 247,924 | 5/1978 | Yamanaka . |
| D. 323,371 | 1/1992 | Ohtaka . |
| D. 350,933 | 9/1994 | Scarambone . |
| 688,672 | 12/1901 | Niemeyer . |
| 1,315,267 | 9/1919 | White . |
| 1,865,895 | 7/1932 | Wheeler . |
| 3,254,622 | 6/1966 | Bramson . |
| 3,320,625 | 5/1967 | Schlueter . |
| 3,543,712 | 12/1970 | Vasilatos . |
| 3,617,070 | 11/1971 | Roberts . |
| 3,722,015 | 3/1973 | Miller et al. . |
| 4,886,476 | 12/1989 | Brocone et al. . |
| 4,929,207 | 5/1990 | Piatt . |
| 5,318,467 | 6/1994 | McIntyre . |
| 5,389,023 | 2/1995 | McIntyre . |
| 5,498,184 | 3/1996 | Saghri . |

*Primary Examiner*—Stephen Avila
*Attorney, Agent, or Firm*—Cushman Darby & Cushman IP Group of Pillsbury Madison & Sutro LLP

[57] ABSTRACT

A body board having a body member and a pair of extensions removably coupled to the body member. The pair of extensions provide a rearward-facing surface that generally faces away from the stern of the body member so that the force of a fluid delivered against the rearward-facing surface propels the body board. A tongue and groove attachment assembly removeably secure each extension to the body member.

20 Claims, 8 Drawing Sheets

ATTACHMENT ASSEMBLY FOR SECURING A HYDRODYNAMIC PROPULSION SURFACE TO A BODY BOARD

BACKGROUND OF THE INVENTION

1. Field of the Invention

The present invention pertains to an attachment assembly for securing a pair of extensions to a body board, and in particular, to a tongue and groove attachment assembly for removably securing a hydrodynamic propulsion surface at the rear of the body board so that fluid impacting on the hydrodynamic surface propels the body board.

2. Description of the Related Art

Recreational aquatic devices, such as body boards or boogie boards, are well known. These devices provide a buoyant surface on which a person lies, sits, or stands. The user propels the body board by paddling, kicking and/or by positioning the body board in front of an incoming wave so that the body board surfs down the front of the wave. To use a conventional body board, the user lies on the body board so that the upper torso is supported by the body board. The user positions the board relative to the incoming wave so that as a wave lifts the body board, gravity propels the body board enabling the body board and rider to surf down the face of the wave. Using a body board in this manner requires a great degree of skill and expertise in order to position the body board properly relative to the incoming waves and to maneuver the board when on the wave so as to continue surfing the wave while the wave progresses toward shore.

Less experienced users of a conventional body board, such as children and individuals who are unable to swim, are unable to use the above-described conventional body board to surf an incoming wave. Instead, less experienced users tend to lie or sit on the conventional body board and let the crashing waves propel the body board forward. When using a conventional body board in this manner, the propulsion force imparted on the body board and user comes from the force of the waves impacting on the rear surface of the body board as well as on the rearward facing surface of the user. However, when using a body board in this manner, the propulsive force imparted on the body board is relatively small due to the small surface area against which the incoming waves impact.

In addition, inexperienced body board users have difficultly maintaining their balance on a conventional body board, especially as the waves impact on the body board and user, due to the instability of conventional body boards.

Other conventional aquatic devices, such as those taught by U.S. Pat. Nos. 1,865,985 and 1,315,267, include a device attached to the underside of a floating surfboard. When the speed of the water rushing under the craft is greater than the speed of the craft, the device attached to the underside of the draft actuates so as to provide an obstacle against which the rushing water impacts for propelling the craft.

In the conventional aquatic devices described immediately above, the mechanical device is attached to the underside of the surfboard. As a result of this configuration, the device attached to the underside of the surfboard must necessarily be movable so that when the surfboard is moving at least as fast as the rushing water, the device is moved to a position whereby drag is reduced so that the device does not slow down the surfboard. Providing a moving mechanical device complicates the manufacture of the surfboard. In addition, the device may not reliably operate, can be easily damage, and will likely wear out over time.

SUMMARY OF THE INVENTION

It is an object of the present invention to provide a body board and a propulsion system that overcomes the problems associated with the above-described conventional body boards. In this regard, it is a further object of the present invention to provide a body board that is easy to use and more stable than conventional body boards and the provides a propulsive surface that overcomes the problems of the above-described devices attached to the underside of a floating surfboard. A still further object of the present invention is to provide an attachment assembly for removeably and reliably securing hydrodynamic propulsion surfaces at the rear of a body board so that fluid impacting on the hydrodynamic surface propels the body board.

In accordance with the principles of the present invention, the foregoing objects are achieved by providing a body board including a body member having a bow and a stern that provides a surface capable of supporting a person lying thereon. A pair of extensions are removeably coupled to the body member by a tongue and groove attachment assembly such that an entirety of each extension is substantially maintained in a fixed position relative to the body member. Each extension provides a surface generally facing the stern of the body member so that fluid delivered in a direction generally from the stern toward the bow of the body member exerts a force against this generally rearward-facing surface to propel the body board. Furthermore, each extension is shaped so that an area defined by the rearward-facing surface is substantially equivalent to a maximum cross-sectional area of that extension taken along a plane perpendicular to a longitudinal axis of the body member and so that the maximum cross-sectional area of that extension is only located proximate to the stern of the body member.

Further objects, features and characteristics of the present convention, as well as the functions of the related elements of the structure, and the economies of manufacture will become more apparent upon consideration of the foregoing description and the appended claims with reference to the accompanying drawings, all of which form a part of the specification, wherein like reference numerals designate corresponding parts of the various figures.

DETAILED DESCRIPTION OF THE PRESENTLY PREFERRED EMBODIMENTS

An exemplary embodiment of a body board according to the principles of the present invention is discussed below with reference to FIGS. 1–4.

Figure 1:
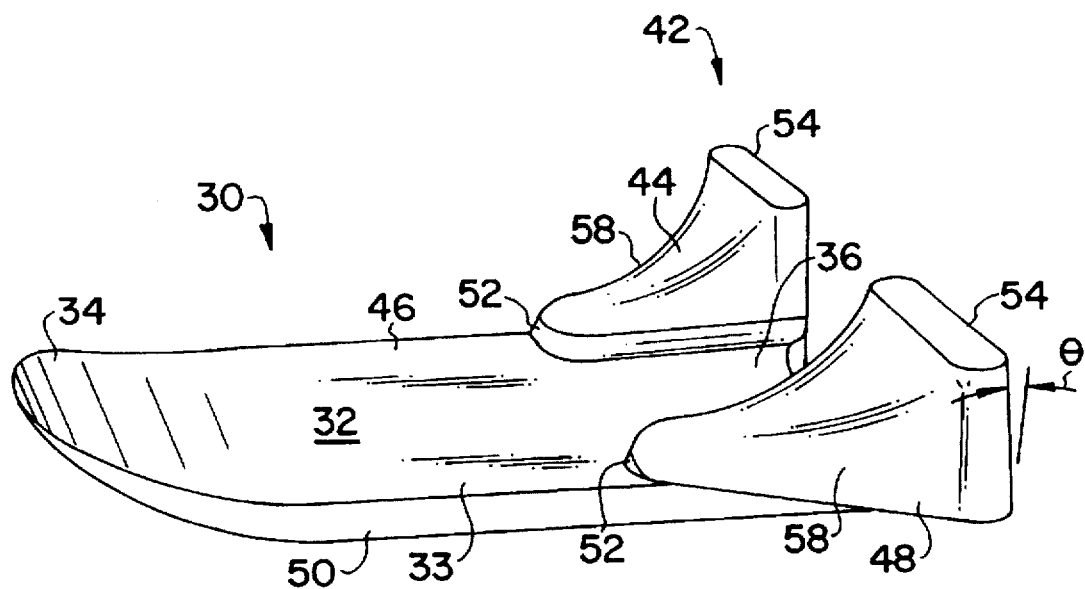
FIG. 1 is a front perspective view of a body board according to the principles of the present invention.
Figure 2:
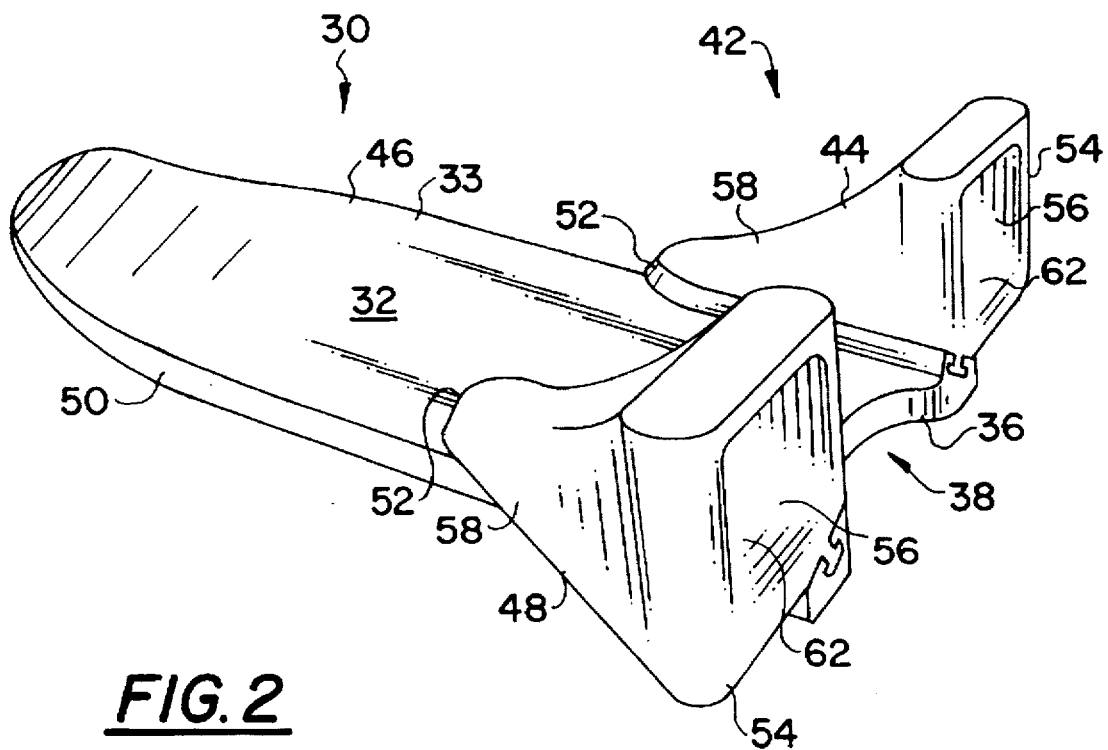
FIG. 2 is a rear perspective view of the body board illustrated in FIG. 1.

FIG. 1 is a front perspective view of a body board which is generally indicated at 30. Body board 30 includes a body member 32 having a bow 34 and a stern 36. In the illustrated embodiment, body member 32 has a substantially flat portion 33 that supports a person lying thereon. Bow 34 of body member 32 is rounded to allow body member 32 to move easily through a fluid such as water. In addition, bow 34 is curved upward to enable the body board to remain above water as it is pushed by a wave. For example, the upward curvature of the bow prevents the bow from being forced underwater as the body board is propelled forward along the face of a wave.

Figure 3:
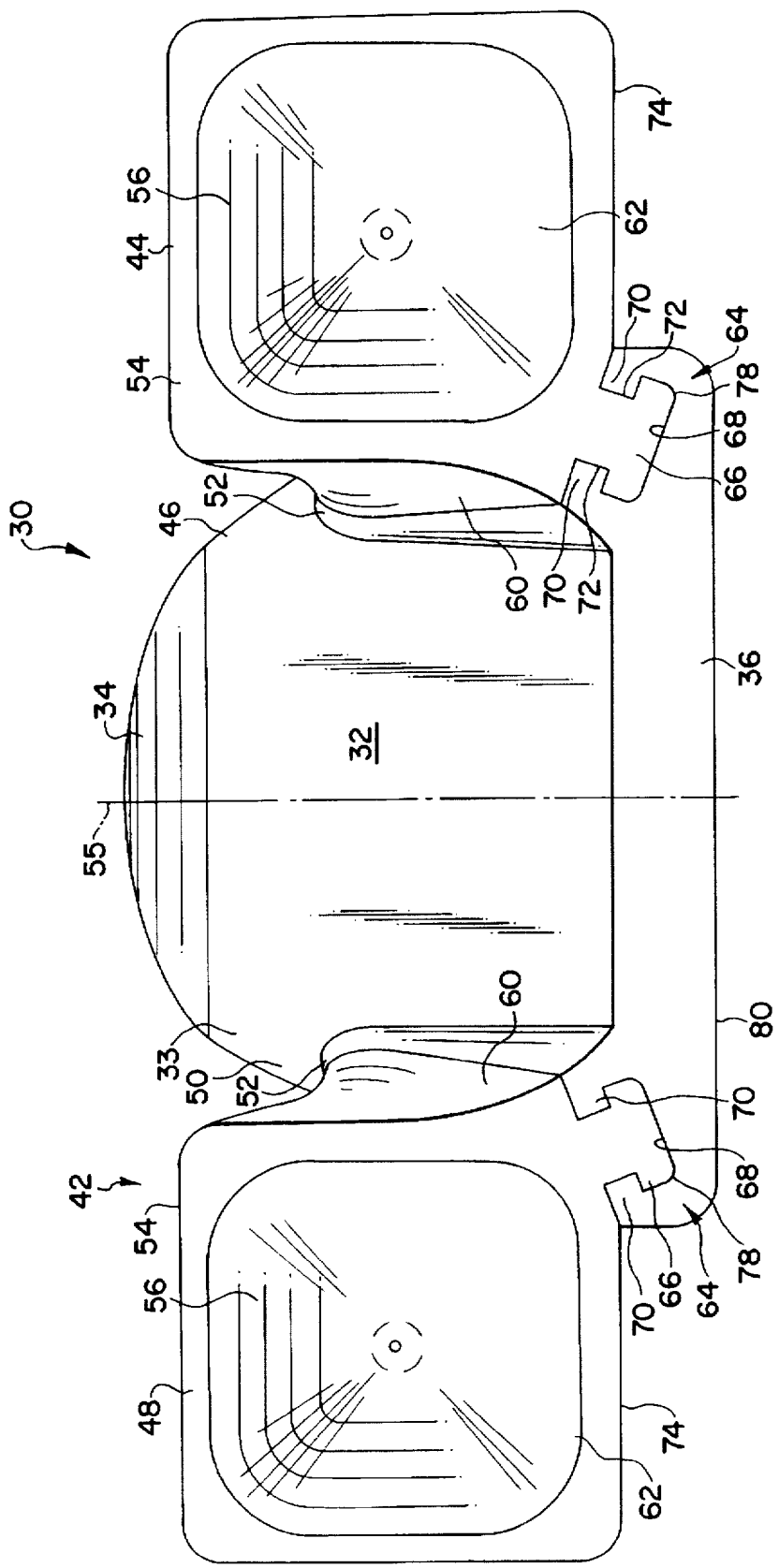
FIG. 3 is a perspective view of the body board illustrated in FIG. 1 viewed directly from the rear of the body board.

During normal use, the user lies on the upper surface of body member 32 so that user's upper torso is supported by body member 32 while the user's legs hang over stern 36. In the embodiment illustrated in FIGS. 1 and 2, a cut-out portion 38 in body member 32 is provided at stern 36 so that the lower portion of the user's body can comfortably extend from stern 36. However, the present invention contemplates that stern 26 can lie in one plane as shown in FIGS. 3 and 4.

While an exemplary embodiment of body member 32 is shown in FIGS. 1–4, it is possible for body member 32 to have other figurations and features. For example, body member 32 need not be entirely flat but, instead, may have other raised portions that enhance the aesthetic appeal or aquadynamic profile thereof. Body member 32 may also have protrusions, such as fins or a keel, for stabilizing the body board. In addition, a rope or leash and/or handles can be provided at various locations on body member 32.

Figure 4:
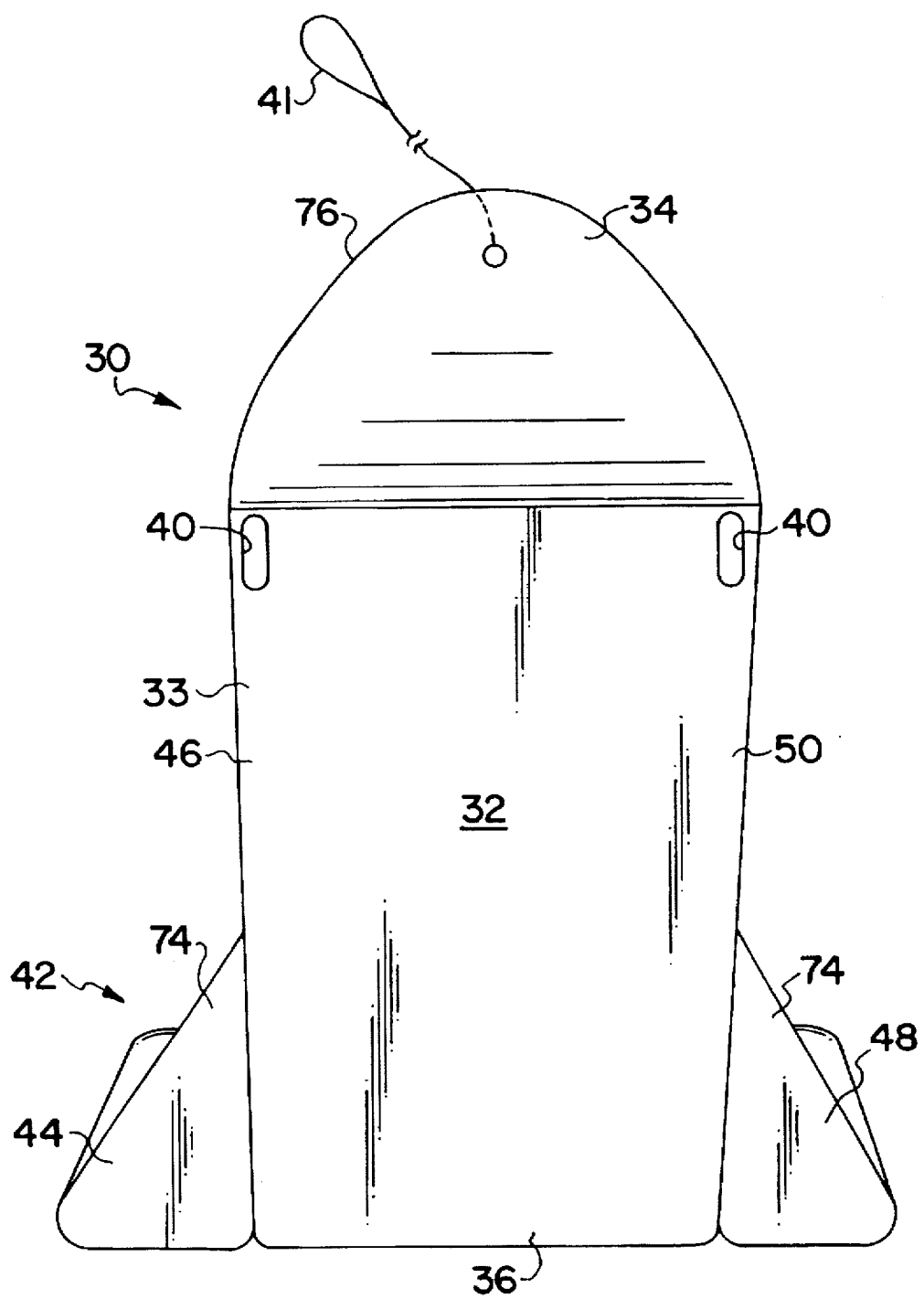
FIG. 4 is a bottom view of the body board illustrated in FIG. 1.

FIG. 4 illustrates a body board having handles 40 and leash 41 so that the user can easily grip body member 32 and/or carry the body board. In the illustrated embodiment, the loop of leash 41 has an fastening device that allows the size of the loop to be adjusted. Leash 41 is attached to body member 32 in any conventional manner.

Body board 30 includes a propulsion system, generally indicated at 42. The propulsion system comprises a first extension 44 attached to a starboard side 46 of body member 32 and a second extension 48 attached to a port side 50 of body member 32. A detailed description of extensions 44 and 48 and the manner in which they are selectively attached to body member 32 is provided below.

Each extension 44 and 48 includes a first end 52 and a second end 54. When extensions 44 and 48 are coupled to body member 32, first end 52 is proximate to bow 34 and second end 54 is proximate to stern 36. Each extension 44 and 48 includes a rearward-facing surface 56 that generally faces away from stern 36 of body member 32 when extensions 44 and 48 are coupled thereto. Each extension 44 and 48 also includes a flared surface 58 that tapers outward in a direction from first end 52 toward second end 54. Flared surface 58 aquadynamically streamlines extensions 44 and 48 so that fluid can easily flow over each extension in a direction from first end 52 toward second end 54. Flared surface 58 also includes a rounded portion 60 on the interior side of extensions 44 and 48 facing one another so that the user lying on body member 32 is comfortably supported between extensions 44 and 48.

Flared surface 58 is provided by shaping extension 44 and 48 such that a cross-sectional area of extension 44 and 48 increases in a direction from first end 52 toward second end 54, wherein the cross-sectional area of the extension is defined by a plane that is generally perpendicular to a longitudinal axis 55 of body member 32.

Each extension 44 and 48 is shaped so that the area defined by rearward-facing surface 56 corresponds to a maximum of the cross-sectional area of that extension and so that the maximum cross-sectional area is only located proximate to stern 36 of body member 32. Extension 44 and 48 are shaped in this manner so that a large surface area is provided at the rear of the body member. The greater the surface area at the rear of the body member, the greater the propulsive force generated by fluid striking rearward-facing surface 56.

Furthermore, because extensions 44 and 48 extend from the sides of body member 32, they act as outriggers further enhancing the stability of body board 30. In addition, because extensions 44 and 48 are mounted at stern 36 of the body 32 and a made from a buoyant material, as discussed below, extensions 44 and 48 provide additional flotation at stern 36. This additional flotation reduces the amount by which 26 stern of body member 32 is submerged by the weight of the user, thereby further stabilizing the body board.

In the illustrated embodiment, each rearward-facing surface 56 of extensions 44 and 48 includes a recess 62 defined therein so that each rearward-facing surface 56 is bowl-shaped when extensions 44 and 48 are viewed from the rear. Recess 62 allows the rear of the extension to act as a scoop, trapping fluid propelled against rearward-facing surface 56 within the bowl-like rearward-facing surface 56 thereby enhancing the ability of the fluid striking rearward-facing surface 56 to propel body board 30. That is, extensions 44 and 48 act as a pair of scoops against which fluid impacts so that body board 30 is propelled by the force of the fluid impacting rearward-facing surface 56. The depth of recess can vary depending on the amount of fluid to be trapped therein to maximize the propulsive ability of the extensions.

Extensions 44 and 48 are attached to body member 32 such that rearward-facing surface 56 extends above upper surface 33 of body member 32. Providing extensions 44 and 48 relative to body member 32 in this manner ensures that a substantial portion of rearward-facing surfaces 56 is provided at water level, i.e., the surface of the water, even when the user is lying on body member 32, which tends to sink stern 36. Because the crashing of the waves occurs at the surface of the water, it is desirable to position rearward-facing surfaces 56 at the surface of the water so that the maximum force of the crashing waves impacts on rearward-facing surface 56.

In the illustrated embodiment, extensions 44 and 48 are symmetrically shaped and symmetrically disposed about longitudinal axis 55 of body member 32. In addition, rearward-facing surface 56 is angled slightly upward so that a plane defined by rearward-facing surface 56 is at an angle θ with respect to a plane that is perpendicular to the longitudinal axis of the body member. This upward angle θ of rearward-facing surface 56 enables body board 30 to present a relatively large rearward-facing surface at each extension to the incoming waves, even when the user is positioned on the body member. The weight of the rider will tend to sink the stern of the body member, thereby deflecting the stern downward. The upward angle of the rearward-facing surface in each extension ensures that rearward-facing surfaces 56 face the incoming waves rather then being deflected downward, even when the stern of the body member is deflected downward. A range of angles up to about 20° from vertical is sufficient to achieve this purpose.

U.S. Pat. No. 5,498,184 issued to the present invention, illustrates details regarding the body board and propulsion system. The contents of the U.S. Pat. No. 5,498,184 are hereby incorporated by reference into the present invention. The present invention provides a unique system for attaching the extensions to the body member so that the extensions can be easily removed and attached with a minimal number of parts and with a minimal amount of expertise.

In the illustrated embodiment, extensions 44 and 48 are removably attached to body member 32 via a tongue and groove attachment assembly, generally indicated at 64. Extensions 44 and 48 are made from a rigid material and when attached to body member 32, an entirety of each extension is maintained in a substantially fixed position relative to body member 32. Making the entirety of each extension out of a substantially rigid material and fixing each extension to the body member so that there is substantially no movement of the extension relative to the body member minimizes the complexity of the propulsion system, thereby enhancing its reliability. Furthermore, it ensures that the greatest possible amount of force imparted on the rearward-facing surface of each extension by the crashing waves is transferred to the body member for propelling same.

In the embodiment illustrated in FIGS. 1–4, extensions 44 and 48 include a substantially flat bottom surface 74 that is flush with a upper surface of body member 32 when extensions 44 and 48 are coupled thereto. This structure for extensions 44 and 48 minimizes the depth in which extension 44 and 48 protrude into the water, thereby reducing the drag on the body board.

Extensions 44 and 48 can be made from a variety of materials, such as STYROFOAM or other substantially rigid foam-like material that is capable of withstanding a force applied thereto. Preferably, extensions 44 and 48 and/or body member 32 are made from a material that is also buoyant and light weight. Furthermore, it is to be understood that the extensions 44 and 48 and recesses 62 defined therein, can have a variety of shapes and sizes so long as these alternative configurations correspond to the principles of the present invention discussed above.

Tongue and groove attachment assembly 64 permits extensions 44 and 48 to be easily removed from body member 32 so that the entire unit can be conveniently stored, transported and packaged. In addition, because extensions 44 and 48 removable from body member 32, the design of body board 30 is modular, so that one portion can be readily replaced with a new portion rather than having to acquire an entirely body board. Furthermore, tongue and groove attachment assembly 64 does not require additional parts to attach the extensions to the body member, thereby simplifying the attachment operation and minimizing the complexity and overall cost of the body board.

Figure 5:
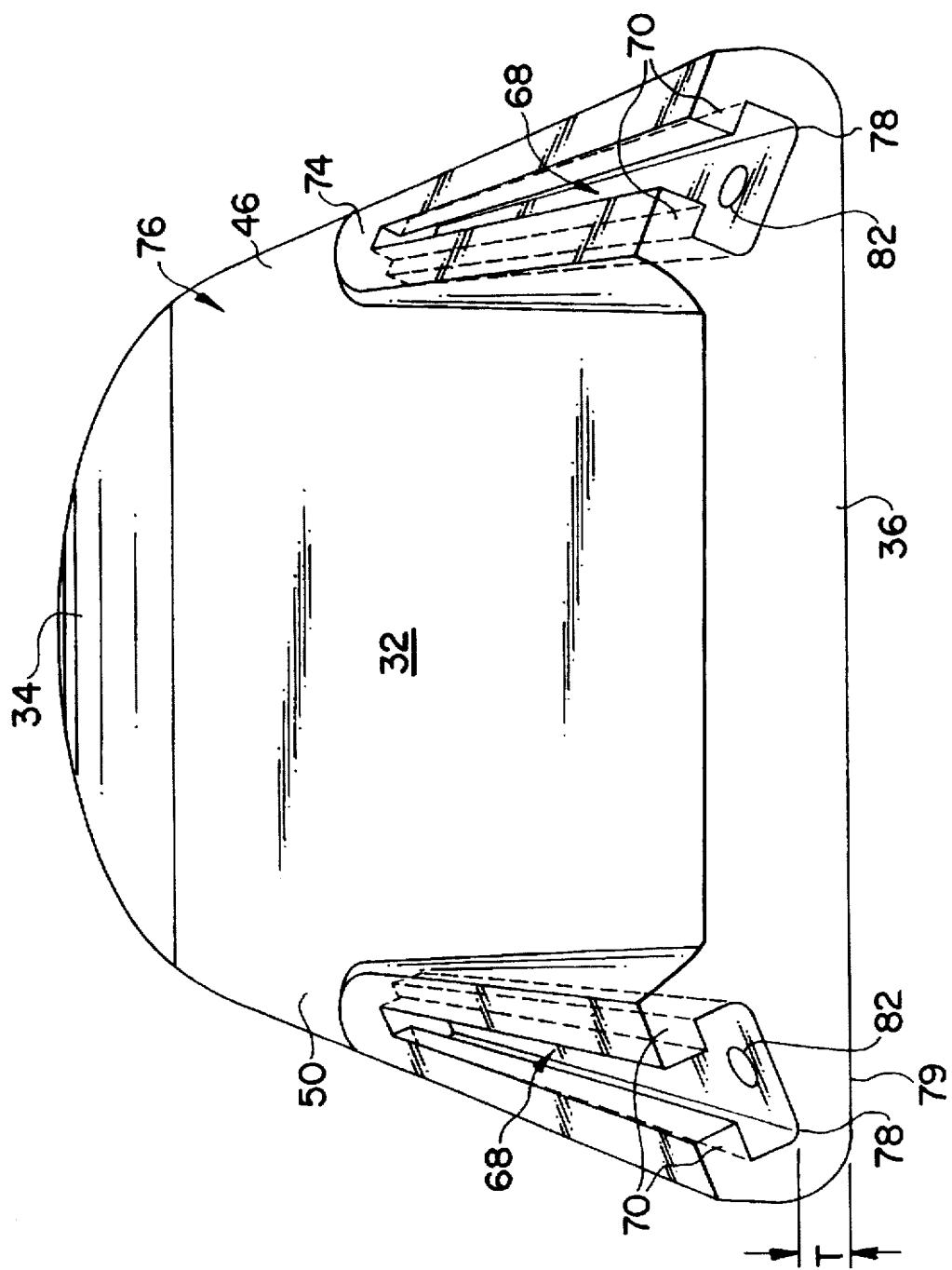
FIG. 5 is a perspective view of the body board illustrated in FIG. 1 viewed from the rear without the extensions attached thereto showing a portion of the tongue and groove attachment assembly.
Figure 6:
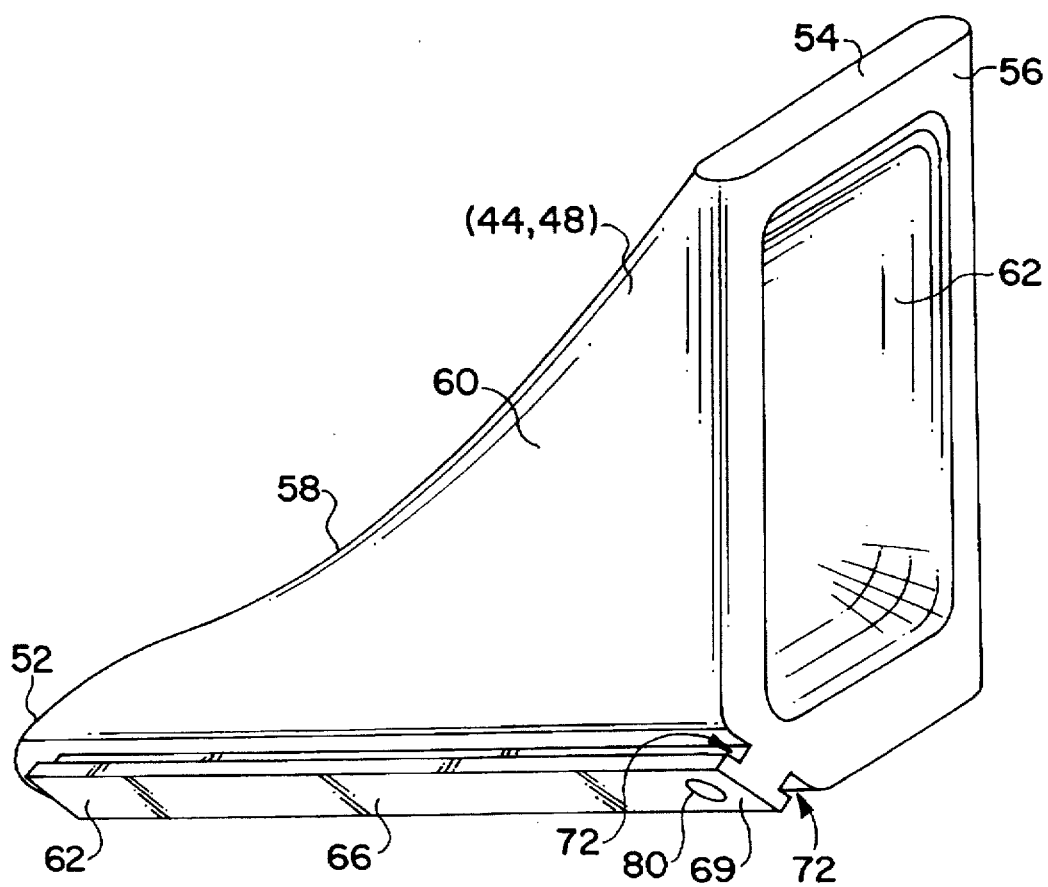
FIG. 6 is a rear perspective view of an extension showing a portion of the tongue and groove attachment assembly.

As shown in FIGS. 3, 5 and 6, each tongue and groove attachment assembly 64 includes a tongue 66 provided on extension 44, 48 and a groove 68 defined in body member 32. Tongue 66 and groove 68 have matching shapes so that tongue 66 can be slid into groove 68 and fit snugly therein. Groove 68 has an open end at stern 36 of body member 32 for receiving tongue 66.

Grooves 68 are provided along the edge portions of body member 32 to secure extensions 44 and 48 to the starboard and port sides of body member 32, respectively. The width of groove 68 can be constant over its length or can reduce gradually along the length of the groove from stern 36 toward bow 34. Groove 68 include protrusion 70 along the length thereof that extends toward the center of the groove. Similarly, tongue 66 includes channels 72 defined along the length thereof. Protrusions 70 engage the walls of channel 72 to secure extensions 44 and 48 to body member 32.

In the embodiment illustrated in FIGS. 1–3 and 4–5, the plane along which extensions 44 and 48 are attached to body member 32 is angled relative to the upper and lower surfaces of body member 32. For example, surface 74 of body member 32 lies in a plane that intersects a plane defined by upper surface 76 of body member 74 at a range of angles from 0°–65°. This angled relationship for the surfaces of extension 44 and 48 that contact body member 32 ensures that a sufficient amount of material exists between the bottom of groove 68 and the bottom of body member so that the strength of the body member is not compromised by providing the tongue and groove attachment assembly.

For similar reasons, the lowermost corner 78 at the bottom of groove 68 and the matching corner on tongue are rounded. Making the corner 78 rounded maximizes the thickness T of material between bottom surface 79 of body member 32 and corner 78. The more material at this location of body member 32, the stronger the body board will be at the connection between body member 32 and extension 44 and 48. The remaining corners in groove 68 and on tongue 66 can be either rounded or square.

To attach extension 44 and 48 to body member 32, a first end 67 of tongue is introduced into the open end of groove 68 at stern 36 of body member 32. Extension 44, 48 is then slid forward toward the bow of body member 32 until the entirety of tongue 66 is in groove 68, at which point, a second end 69 of tongue 66 is proximate to stern 36. When properly engaged, the rearward facing surface at second end 69 of tongue is flush with the rearward facing surface of body member 32 near groove 68.

Although friction between tongue 66 and groove 68 will serve to maintain the extensions in a secure and fixed relation, the present invention also contemplates providing a locking mechanism incorporated in to the tongue and groove attachment assembly to lock extensions 44 and 48 to body member 32 more securely. As shown in FIGS. 5 and 6, the locking mechanism includes a circular protrusion 80 disposed on the surface of tongue that is adjacent to the bottom of groove 68 when the extension is attached to body member 32. In addition, a depression 82 is defined in the bottom of groove 68. When tongue 66 is fully within groove 68, protrusion 80 fits within depression 82, thereby providing an additional engagement between tongue 66 and groove.

In the illustrated embodiment, protrusion 80 and depression 82 are disposed near the stern of tongue 66 and groove 68, respectively. It is to be understood, however, that protrusion 80 and depression 82 can be provided at other locations on tongue and groove. It is to be further understood that protrusion 80 and depression 82 can have a variety of configurations so long as they cooperate within one another to lock tongue 66 within groove 68.

Figure 7:
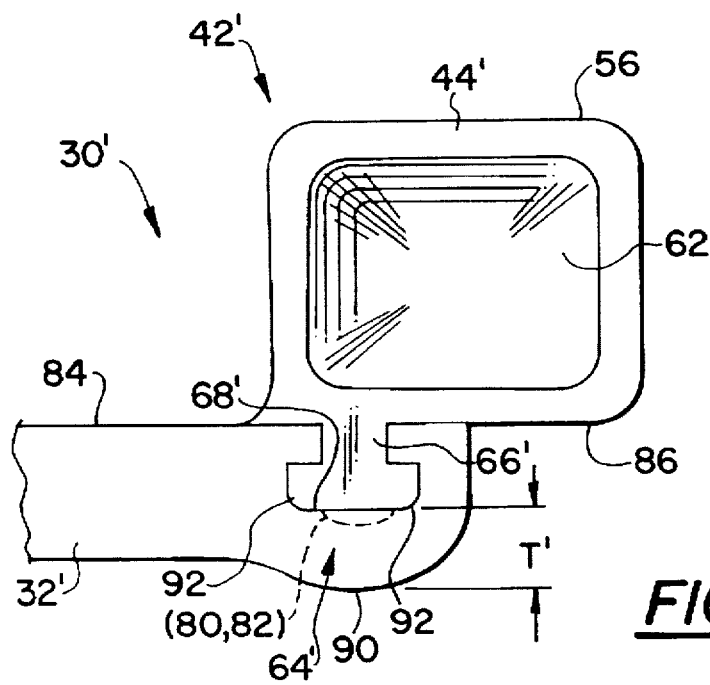
FIG. 7 is a rear view illustrating a variation of the tongue and groove attachment assembly used in a body board according to the present invention.
Figure 8:
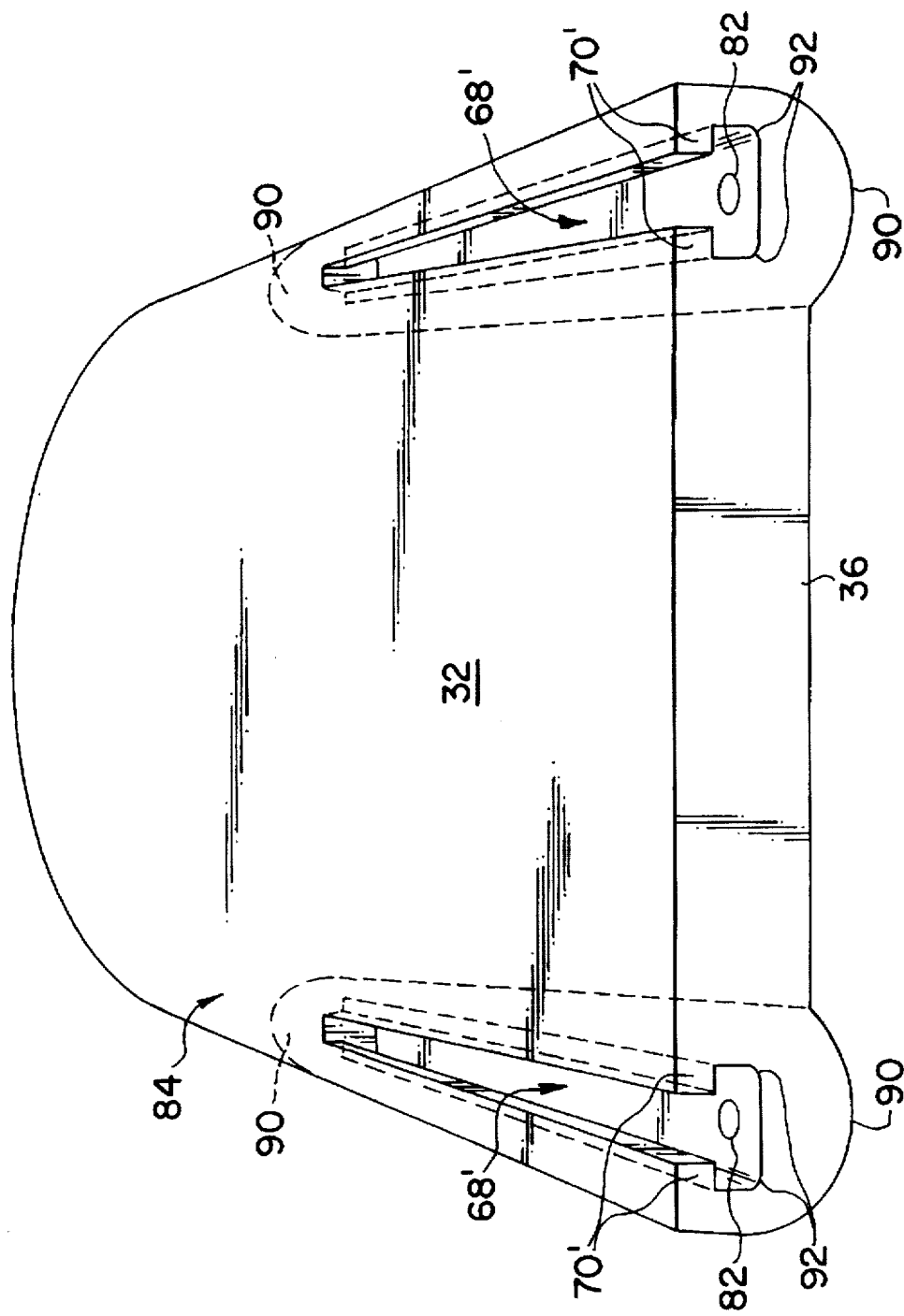
FIG. 8 is a perspective view of the body board illustrated in FIG. 7 viewed from the rear without the extensions attached thereto showing a portion of the tongue and groove attachment assembly.

FIGS. 7 and 8 illustrate an alternative arrangement for a tongue and groove attachment assembly 64' according to the principles of the present invention. In this embodiment, extension 44' is attached to body member 32' such that the plane where extension 44' contacts body member 32' lies in a same plane as upper surface 84 of body member 32', as well as a same plane as a lower surface 86 of extension 44'. Thus, tongue 66' extends in a direction generally perpendicular to lower surface 86 of extension 44'.

To ensure that the peripheral edges of body member 32' where extension 44' is attached has sufficient strength to support the attachment of extension thereto, a build up of material 90 is provided along the peripheral edges of body member 32'. In the illustrated embodiment, the buildup of material 90 extends from the bottom of body member 32. In addition, corners 92 at the bottom of groove 68' are rounded. Providing excess material 90 and rounded corners 92 maximizes the distance T' between the bottom of groove 68' and the bottom of body member 32, thereby maximizing the strength of the portions of body board 30' where body member 32' engages the extensions.

A locking mechanism including protrusion 80 on tongue 66' and a depression defined in groove 68' is also provided in this embodiment.

FIGS. 3 and 5–8 illustrate a tongue provided on the extension and a groove defined in the body member of the body board for the attachment assembly. It is to be understood, however, that in an alternative configuration for the present invention, the tongue can be provided on the body member and the associated grooves are defined in the extensions.

Figure 9:
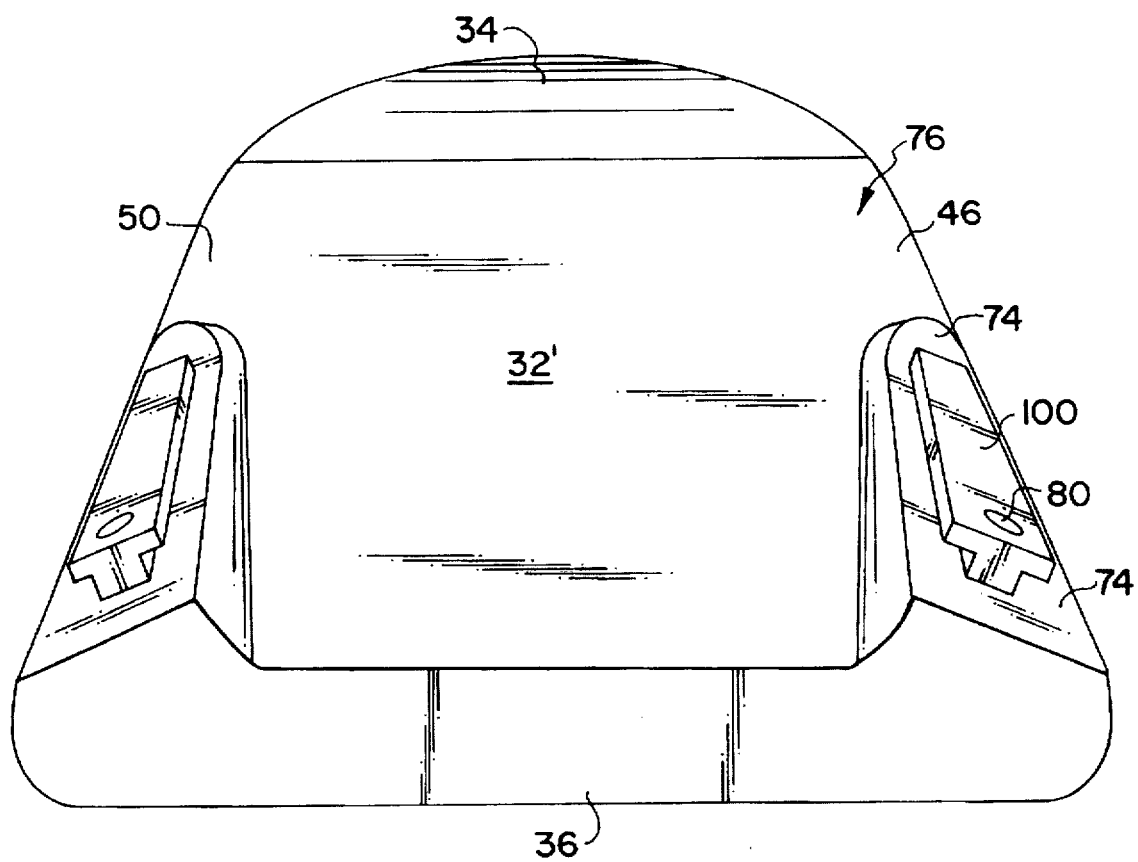
FIG. 9 is a perspective view of an alternative embodiment of a body board viewed from the rear without the extensions attached thereto showing a portion of the tongue and groove attachment assembly.
Figure 10:
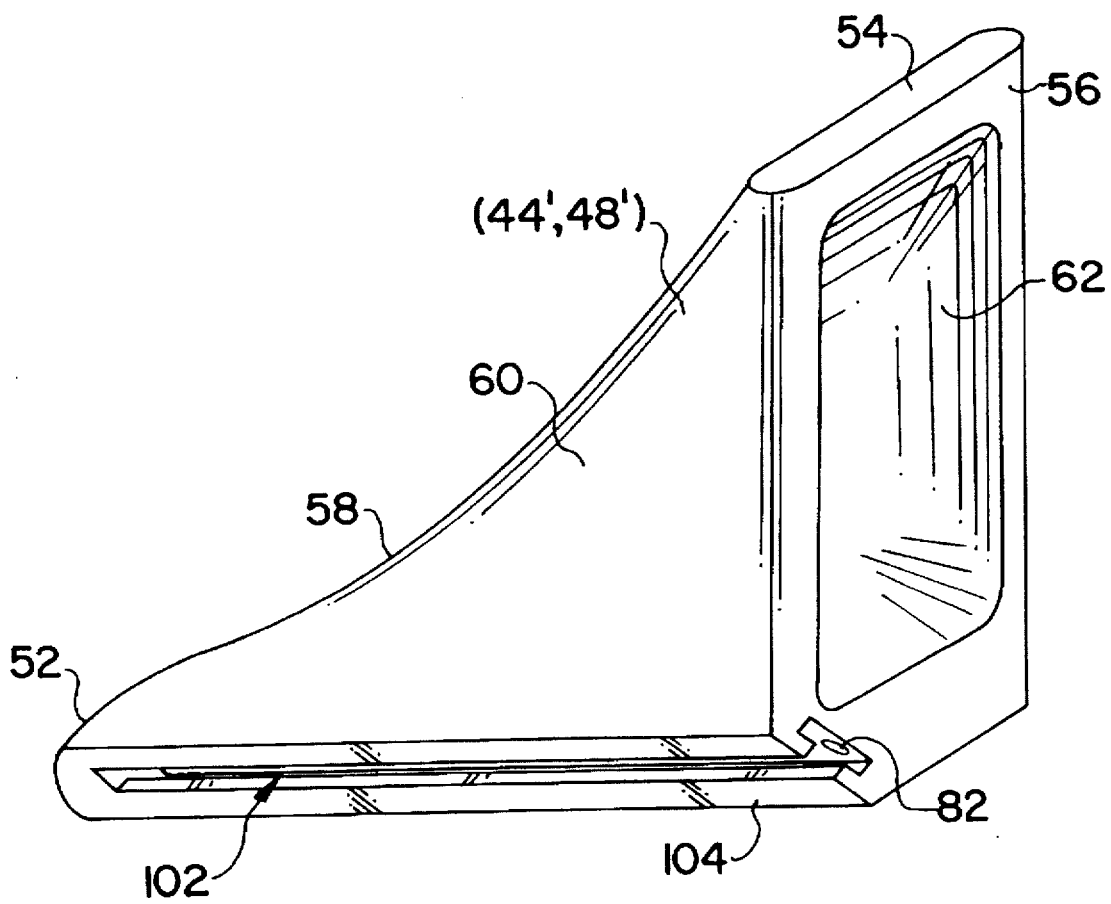
FIG. 10 is a rear perspective view of an alternative embodiment of an extension showing a portion of the tongue and groove attachment assembly.

FIGS. 9 and 10 illustrate a body member 32' and an extension 44',48' having the same general structure as body board 30 and extension 44 and 48 of FIG. 1. Note that only one extension 44' is illustrated in FIG. 10; the other extension 48' being substantially a mirror image of extension 44'.

The main difference between the embodiment of the invention illustrated in FIGS. 9 and 10 and the embodiment illustrated in FIGS. 5 and 6, is that the tongue and groove attachment assembly for coupling extension 44', 48' to body member 32' in FIGS. 9 and 10 is opposite that illustrated in FIGS. 1–8. In particular, in FIGS. 9 and 10 a, tongue 100 is provided on surface 74 of body member 32' while a groove 102 is defined in surface 104 of extension 44'. Tongue 100 has substantially the same configuration as tongue 66 of FIG. 6, and groove 102 has substantially the same configuration as groove 68 of FIG. 5. Also, tongue 100 and groove 102 engage one another to couple extensions 44' and 48' to body member 32' in the same manner as tongue 66 and groove 68 discussed above. As in the embodiment illustrated in FIGS. 5 and 6, tongue 100 in FIG. 9 includes a protrusion 80 that engages a depression 82 in groove 102 of FIG. 10 to facilitate engagement between the extension and body member.

While the present invention has been described in conjunction with what is presently considered to be the more practical preferred embodiment, it is to be understood that the invention is not be limited to the disclosed embodiments but, on the contrary, is intended to cover various modifications and equivalent arrangements included within the spirit and scope of the appended claims.

What is claimed is:

1. A body board comprising:

a body member having a bow and a stern, said body member providing a surface capable of supporting a person lying thereon; and a first extension and a second extension selectively coupled to said body member such that an entirety of each extension is maintained in a substantially fixed position relative to said body member, each of said first and said second extensions providing a rearward-facing surface generally facing away from said stern of said body member so that fluid delivered in a direction generally from said stern toward said bow of said body member exerts a force against said rearward-facing surface to propel said body board, each of said first and said second extensions being shaped so that an area defined by said rearward-facing surface is substantially equivalent to a maximum cross-sectional area of said extension, wherein a cross-sectional area of each of said first and said second extensions is defined by a plane generally perpendicular to a longitudinal axis of said body member, and each of said first and said second extensions being shaped so that said maximum cross-sectional area is only located proximate to said stern of said body member;

a first tongue and groove attachment assembly for removably securing said first extension to said body member at a first edge portion thereof; and a second tongue and groove attachment assembly for removably securing said second extension to said body member at a second edge portion thereof, each first and second tongue and groove attachment assembly including a tongue disposed on one of said body member and an associated extension and a groove defined in a remaining other of said body member and said associated extension, said tongue and said groove in said first and second tongue and groove attachment assemblies having matching configurations such that for each of said first and said second tongue and groove attachment assembly said tongue fits within said groove to provide an engaged relationship therebetween.

2. A body board according to claim 1, wherein said first tongue and groove attachment assembly includes a first tongue disposed on said first extension and a first groove defined along a starboard edge portion of said body member, said second tongue and groove attachment assembly including a second tongue disposed on said second extension and a second groove defined along a port edge portion of said body member, said first groove receiving said first tongue and said second groove receiving said second tongue.

3. A body board according to claim 2, wherein said first and said second grooves are symmetrically disposed about a centerline of said body member and extend from said stern of said body member toward a bow thereof such that said first and said second grooves each have an open end at said stern for receiving a respective one of said first and said second tongues therein.

4. A body board according to claim 3, wherein each of said first and said second grooves includes a first protrusion disposed on a first wall and extending along at least a portion of a length thereof and a second protrusion disposed on a second wall and extending along at least a portion of a length thereof, wherein each of said first and said second tongues includes a pair of channels defined therein, each channel in said pair of channels being defined on opposite sides of said first and said second tongue, and wherein for each of said first and said second tongues and associated first and second grooves, said first and said second protrusions are received in said pair of channels responsive to said first and said second extensions being coupled to said body member.

5. A body board according to claim 4, wherein a first surface of said body member proximate to said first groove contacting said first extension when said first extension is coupled to said body member lies in a first plane and a second surface of said body member proximate to said second groove contacting said second extension when said second extension is coupled to said body member lies in a second plane, said first and said second planes being disposed at a non-zero angle with respect to said surface of said body member, said first groove being defined in said first surface such that a first plane intersects a bottom of said first groove and said first surface at right angles, and said second groove being defined in said second surface such that a second plane intersects a bottom of said second groove and said second surface at right angles.

6. A body board according to claim 5, further comprising a locking mechanism associated with each of said first and said second tongue and groove attachment assemblies for securing each tongue within an associated groove.

7. A body board according to claim 6, wherein said locking mechanism in each of said first and said second tongue and groove attachment assemblies includes a locking protrusion disposed on one of said tongue and said groove and a depression defined in a remaining other of said tongue and said groove, said depression being sized so as to receive said locking protrusion therein when each associated extension is coupled to said body member.

8. A body board according to claim 7, wherein a corner at a lowermost portion of said first and said second grooves relative to said surface of said body member is rounded.

9. A body board according to claim 4, wherein a surface of said body member proximate to said first groove contacting said first extension when said first extension is coupled to said body member and a second surface of said body member proximate to said second groove contacting said second extension when said second extension is coupled to said body member lie in a same plane as a plane defined by said surface of said body member, said first groove being defined in said first surface such that a first plane intersects a bottom of said first groove and said surface of said body member at right angles, and said second groove being defined in said second surface such that a second plane intersects a bottom of said second groove and said surface of said body member at right angles.

10. A body board according to claim 9, further comprising a buildup of material provided on a surface of said body member opposite a surface in which said first and said second groove are defined, said buildup of material being disposed along both said starboard edge portion and said port edge portion of said body member along lengths thereof corresponding to lengths of said first and second grooves.

11. A body board according to claim 1, wherein at least one of said body member and said pair of extensions are made from a buoyant material capable of maintaining its shape against a force applied thereto.

12. A body board according to claim 1, wherein said cross-sectional area of each of said first and said second extensions generally increases over a length of each first and second extension in a direction toward said stern of said body member so as to provide a aquadynamically streamlined surface generally facing said bow of said body member so that fluid flows easily over each first and second extension in a direction from said bow to said stern.

13. A body board according to claim 1, wherein said bow of said body member is upward angled toward said surface of said body member.

14. A body board according to claim 1, further comprising a locking mechanism associated with each of said first and said second tongue and groove attachment assemblies for securing each tongue within an associated groove.

15. A body board according to claim 14, wherein said locking mechanism in each of said first and said second tongue and groove attachment assemblies includes a locking protrusion disposed on one of said tongue and said groove and a depression defined in a remaining other of said tongue and said groove, said depression being sized so as to receive said locking protrusion therein when each associated extension is coupled to said body member.

16. A body board according to claim 1, wherein said first tongue and groove attachment assembly includes a first tongue disposed on a starboard portion said body member and a first groove defined in said first extension, said second tongue and groove attachment assembly including a second tongue disposed on port portion of said body member and a second groove defined in said second extension, said first groove receiving said first tongue and said second groove receiving said second tongue.

17. A body board according to claim 16, wherein said first and said second tongues are symmetrically disposed about a centerline of said body member and extend from a position proximate to said stern of said body member toward a bow thereof.

18. A body board according to claim 17, wherein each of said first and said second grooves includes a first protrusion disposed on a first wall and extending along at least a portion of a length thereof and a second protrusion disposed on a second wall and extending along at least a portion of a length thereof, wherein each of said first and said second tongues includes a pair of channels defined therein, each channel in said pair of channels being defined on opposite sides of said first and said second tongue, and wherein for each of said first and said second tongues and associated first and second grooves, said first and said second protrusions are received in said pair of channels responsive to said first and said second extensions being coupled to said body member.

19. A body board according to claim 17, further comprising a locking mechanism associated with each of said first and said second tongue and groove attachment assemblies for securing each tongue within an associated groove.

20. A body board according to claim 19, wherein said locking mechanism in each of said first and said second tongue and groove attachment assemblies includes a locking protrusion disposed on one of said tongue and said groove and a depression defined in a remaining other of said tongue and said groove, said depression being sized so as to receive said locking protrusion therein when each associated extension is coupled to said body member.

* * * * *